US012706975B2

(12) United States Patent
Peters et al.

(10) Patent No.: US 12,706,975 B2
(45) **Date of Patent: *Aug. 11, 2026**

(54) TRANSITION BETWEEN NETWORK CONNECTIONS

(71) Applicant: Sonos, Inc., Santa Barbara, CA (US)

(72) Inventors: Jeffrey M. Peters, Cambridge, MA (US); Nicholas A.J. Millington, Santa Barbara, CA (US); Jose Graziani, Shrewsbury, MA (US); Ted Lin, Ayer, MA (US)

(73) Assignee: Sonos, Inc., Goleta, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/497,372

(22) Filed: Oct. 30, 2023

(65) Prior Publication Data

US 2024/0146811 A1 May 2, 2024

Related U.S. Application Data

(63) Continuation of application No. 17/316,334, filed on May 10, 2021, now Pat. No. 11,805,174, which is a (Continued)

(51) Int. Cl.
*H04L 67/125* (2022.01)
*H04L 12/28* (2006.01)
(Continued)

(52) U.S. Cl.
CPC ........ *H04L 67/125* (2013.01); *H04L 12/2838* (2013.01); *H04L 41/0816* (2013.01);
(Continued)

(58) Field of Classification Search
CPC ............... H04L 67/125; H04L 12/2838; H04L 41/0816; H04L 12/2803; H04L 2012/2841; H04N 21/43615
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |

(Continued)

FOREIGN PATENT DOCUMENTS

| | | | |
|---|---|---|---|
| CN | 1627716 | A | 6/2005 |
| CN | 1764134 | A | 4/2006 |

(Continued)

OTHER PUBLICATIONS

Advisory Action mailed on Nov. 18, 2019, issued in connection with U.S. Appl. No. 15/246,914, filed Aug. 25, 2016, 3 pages.

(Continued)

*Primary Examiner* — Farzana B Huq

(57) ABSTRACT

A computing device may broadcast a first message via a wireless interface while operating according to a first network topology. After broadcasting the first message, the computing device may receive the first message via a wired interface. Based on receiving the first message via the wired interface, the computing device may broadcast a second message indicating a second network topology via the wireless interface. Based on receiving the first message via the wired interface, the computing device may operate according to the second network topology.

20 Claims, 13 Drawing Sheets

Related U.S. Application Data continuation of application No. 15/246,914, filed on Aug. 25, 2016, now Pat. No. 11,005,940, which is a continuation of application No. 14/042,038, filed on Sep. 30, 2013, now Pat. No. 9,456,037.

(51) Int. Cl.
*H04L 41/0816* (2022.01)
*H04N 21/436* (2011.01)

(52) U.S. Cl.
CPC ... *H04N 21/43615* (2013.01); *H04L 12/2803* (2013.01); *H04L 2012/2841* (2013.01)

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,137,802 A | 10/2000 | Jones et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 6,801,529 B1 | 10/2004 | Mcgrane et al. | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,949,727 B2 | 5/2011 | Jensen | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,493,896 B2 | 7/2013 | Yu et al. | |
| 8,538,564 B2 | 9/2013 | Almstrand et al. | |
| 8,572,224 B2 | 10/2013 | Hite et al. | |
| 9,191,699 B2 | 11/2015 | Agerbak et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0114317 A1 | 8/2002 | Dorenbosch et al. | |
| 2002/0124097 A1 | 9/2002 | Isely et al. | |
| 2003/0012164 A1 | 1/2003 | Mizoguchi et al. | |
| 2003/0157951 A1 | 8/2003 | Hasty, Jr. | |
| 2004/0024478 A1 | 2/2004 | Hans et al. | |
| 2004/0168081 A1* | 8/2004 | Ladas | H04W 12/50 726/8 |
| 2006/0020697 A1 | 1/2006 | Kelso et al. | |
| 2006/0034253 A1 | 2/2006 | Yurugi et al. | |
| 2006/0142451 A1 | 6/2006 | Yushina et al. | |
| 2006/0212136 A1 | 9/2006 | Lee et al. | |
| 2007/0142944 A1 | 6/2007 | Goldberg et al. | |
| 2007/0180137 A1 | 8/2007 | Rajapakse | |
| 2008/0092204 A1 | 4/2008 | Bryce et al. | |
| 2010/0189011 A1* | 7/2010 | Jing | H04W 40/244 370/254 |
| 2011/0116413 A1 | 5/2011 | Arai | |
| 2012/0290689 A1 | 11/2012 | Beguelin et al. | |
| 2013/0173794 A1* | 7/2013 | Agerbak | H04W 48/18 709/225 |
| 2014/0036705 A1 | 2/2014 | Ma et al. | |
| 2014/0112198 A1 | 4/2014 | Pang et al. | |
| 2014/0195584 A1 | 7/2014 | Harrison | |

FOREIGN PATENT DOCUMENTS

| | | |
|---|---|---|
| CN | 1324853 C | 7/2007 |
| CN | 101212428 A | 7/2008 |
| CN | 102065508 A | 5/2011 |
| CN | 102917406 A | 2/2013 |
| EP | 1389853 A1 | 2/2004 |
| EP | 1471691 A2 | 10/2004 |
| JP | 2010056955 A | 3/2010 |
| WO | 0154353 A1 | 7/2001 |
| WO | 200153994 | 7/2001 |
| WO | 03017600 A1 | 2/2003 |
| WO | 2003093950 A2 | 11/2003 |
| WO | 2006123218 A2 | 11/2006 |

OTHER PUBLICATIONS

Advisory Action mailed on Mar. 28, 2016, issued in connection with U.S. Appl. No. 14/042,038, filed Sep. 30, 2013, 4 pages.

AudioTron Quick Start Guide, Version 1.0, Mar. 2001, 24 pages.

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Chinese Patent Office, First Office Action and Translation mailed on Apr. 15, 2020, issued in connection with Chinese Application No. 201710909437.0, 11 pages.

Chinese Patent Office, First Office Action mailed on May 27, 2017, issued in connection with Chinese Patent Application No. 201480053819.2, 5 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

European Patent Office, European Office Action mailed on Dec. 17, 2018, issued in connection with European Application No. 14847794.6, 6 pages.

European Patent Office, Extended European Search Report mailed Aug. 4, 2016, issued in connection with European patent application No. 14847794.6-1862, 8 pages.

European Patent Office, Office Action mailed Jan. 8, 2018, issued in connection with EP Application No. 14847794.6, 5 pages.

European Patent Office, Office Action mailed on May 19, 2017, issued in connection with European Application No. 148477946, 5 pages.

Final Office Action mailed on Jan. 15, 2016, issued in connection with U.S. Appl. No. 14/042,038, filed Sep. 30, 2013, 8 pages.

Final Office Action mailed on Jul. 29, 2019, issued in connection with U.S. Appl. No. 15/246,914, filed Aug. 25, 2016, 16 pages.

International Searching Authority, International Search Report mailed on Dec. 24, 2014, issued in connection with International patent application No. PCT/US2014/057489, 5 pages.

International Searching Authority, Written Opinion mailed on Dec. 24, 2014, issued in connection with International Application No. PCT/US2014/057489, filed on Sep. 25, 2014, 7 pages.

Japanese Patent Office, Full English Translation of Office Action mailed on May 30, 2017, issued in connection with Japanese Patent Application No. 2016-518762, 2 pages.

Japanese Patent Office, Office Action mailed on Aug. 28, 2018, issued in connection with Japanese Application No. 2017-212019, 5 pages.

Japanese Patent Office, Office Action mailed on May 30, 2017, issued in connection with Japanese Application No. 2016-518762, 6 pages.

(56) References Cited

OTHER PUBLICATIONS

Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Aug. 10, 2015, issued in connection with U.S. Appl. No. 14/042,038, filed Sep. 30, 2013, 9 pages.
Non-Final Office Action mailed on Jan. 11, 2019, issued in connection with U.S. Appl. No. 15/246,914, filed Aug. 25, 2016, 14 pages.
Non-Final Office Action mailed on Jan. 13, 2020, issued in connection with U.S. Appl. No. 15/246,914, filed Aug. 25, 2016, 17 pages.
Non-Final Office Action mailed on May 13, 2020, issued in connection with U.S. Appl. No. 15/246,914, filed Aug. 25, 2016, 18 pages.
Non-Final Office Action mailed on Dec. 8, 2022, issued in connection with U.S. Appl. No. 17/316,334, filed May 10, 2021, 12 pages.
Notice of Allowance mailed on Jun. 14, 2023, issued in connection with U.S. Appl. No. 17/316,334, filed May 10, 2021, 13 pages.
Notice of Allowance mailed on May 24, 2016, issued in connection with U.S. Appl. No. 14/042,038, filed Sep. 30, 2013, 7 pages.
Notice of Allowance mailed on Jan. 8, 2021, issued in connection with U.S. Appl. No. 15/246,914, filed Aug. 25, 2016, 9 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

TRANSITION BETWEEN NETWORK CONNECTIONS

CROSS-REFERENCE TO RELATED APPLICATIONS

The present application claims the benefit of and priority as a continuation under 35 U.S.C. § 120 to U.S. patent application Ser. No. 17/316,334, filed on May 10, 2021, entitled "Transition Between Network Connections," which is a continuation of U.S. patent application Ser. No. 15/246,914, filed on Aug. 25, 2016, entitled "Network Topology Based on a Useful Wired Connection," which is a continuation of U.S. patent application Ser. No. 14/042,038, filed on Sep. 30, 2013, entitled "Identifying a Useful Wired Connection," now U.S. Pat. No. 9,456,037, the contents of each of which is herein incorporated by reference in its entirety for all purposes.

FIELD OF THE DISCLOSURE

The disclosure is related to consumer goods and, more particularly, to systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, SONOS™ offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud in synchrony. The SONOS™ system can be controlled by software applications downloaded to certain network capable, mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology are better understood with regard to the following description, appended claims, and accompanying drawings where:

Figure 1:
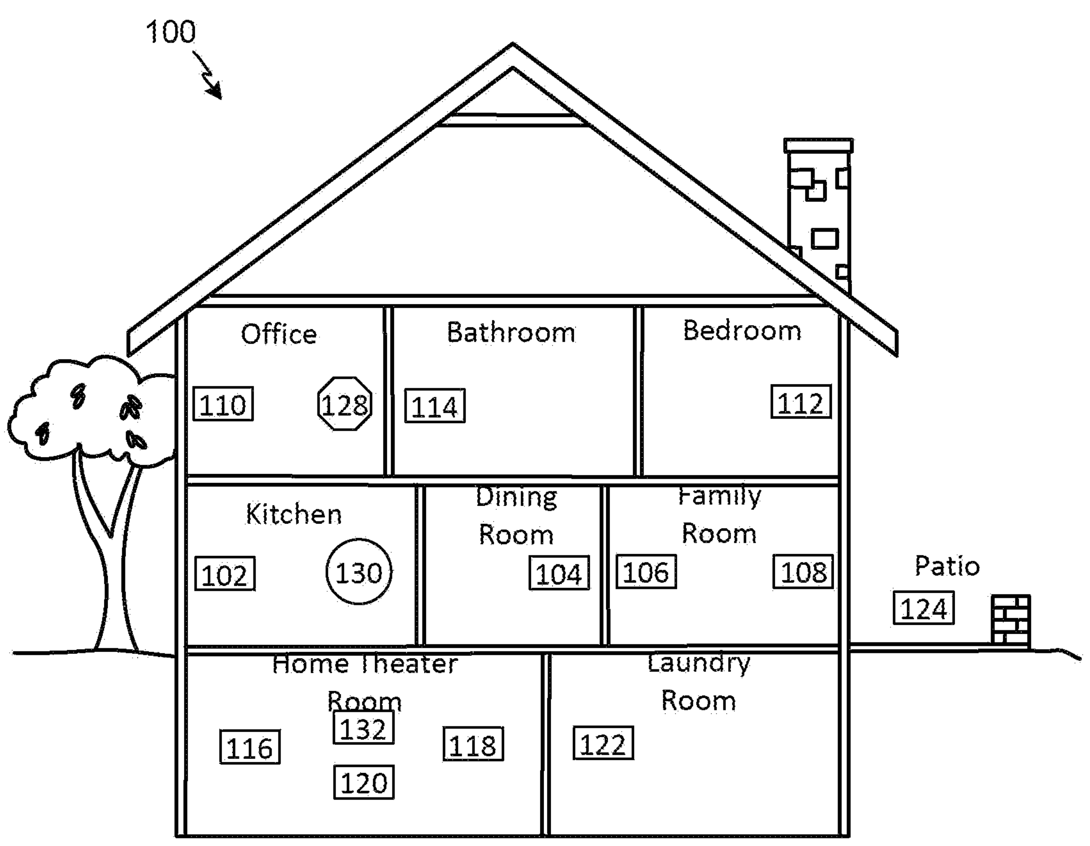
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

The present disclosure provides various mechanisms to support connection to a network and facilitation of playback of audio and/or video content over the network. More particularly, the present disclosure describes facilitating wired and/or wireless connection of a device to a playback network.

In certain examples, playback devices can connect to a playback network, such as SONOSNET™, via wireless and/or wired connection. For example, a device can be connected to the playback network via a wireless access point (AP), which provides connectivity to the wireless playback network. In another example, a device can be connected directly to the wireless playback network itself without connecting to an access point. Certain examples provide an automatic and seamless mechanism to switch from an AP-based wireless network to the wireless playback network.

In certain examples, the wireless playback network is a mesh network (e.g., a layer-2 mesh network) that supports both wired and wireless interfaces. Devices that participate in the playback network have a wireless interface, a wired interface, or both. In certain examples, it is useful to know if the wired interface is connected to a router or AP. For example, it can be beneficial to have at least one device of a wireless playback network connected via a wired interface to an AP. For example, the wired connection may provide Internet access to the devices of the wireless playback system. Additionally, the wired connection bridges connectivity between devices on the wireless playback system and devices connected to the AP without configuring a device to operate on both wireless networks. Certain examples provide systems, methods, and apparatus to determine a useful wired connection in a mixed wireless/wired network. A useful wired connection is defined as a wired connection that is connected between two devices that are already communicating over a wireless broadcast medium, for example.

In an embodiment, a media playback network uses a wireless (or wired, or both wireless and wired) mesh network that allows devices, such as zone players, network media sources, and an access point to communicate with each other. Additionally, the network system may use a network protocol such as, for example, a Spanning Tree Protocol (STP) with direct routing to provide certain benefits, such as peer-to-peer communication without routing loops. In an embodiment, a networked audio component, such as a zone player, can override the use of the STP protocol in view of a direct routing scheme, to optimize certain kinds of multicast traffic.

Although the following discloses example systems, methods, apparatus, and articles of manufacture including, among other components, firmware and/or software executed on hardware, it should be noted that such systems, methods, apparatus, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

These embodiments and many additional embodiments are described more below. Further, the detailed description is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments.

II. An Example Operating Environment

Referring now to the drawings, in which like numerals can refer to like parts throughout the figures, FIG. 1 shows an example system configuration 100 in which one or more embodiments disclosed herein can be practiced or implemented.

By way of illustration, the system configuration 100 represents a home with multiple zones, though the home could have been configured with only one zone. Each zone, for example, may represent a different room or space, such as an office, bathroom, bedroom, kitchen, dining room, family room, home theater room, utility or laundry room, and patio. A single zone might also include multiple rooms or spaces if so configured. One or more of zone players 102-124 are shown in each respective zone. A zone player 102-124, also referred to as a playback device, multimedia unit, speaker, player, and so on, provides audio, video, and/or audiovisual output. A controller 130 (e.g., shown in the kitchen for purposes of illustration) provides control to the system configuration 100. Controller 130 may be fixed to a zone, or alternatively, mobile such that it can be moved about the zones. System configuration 100 may also include more than one controller 130. The system configuration 100 illustrates an example whole house audio system, though it is understood that the technology described herein is not limited to its particular place of application or to an expansive system like a whole house audio system 100 of FIG. 1.

a. Example Zone Players

Figure 2A:
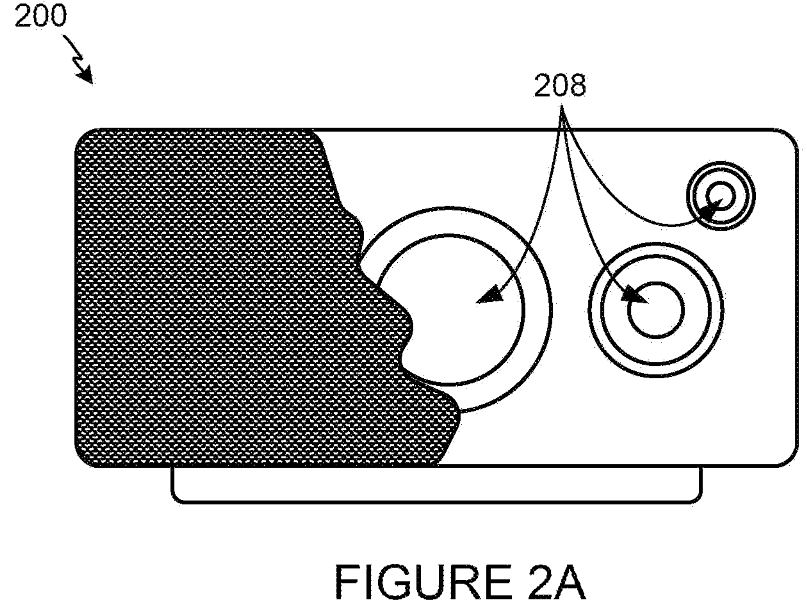
FIG. 2A shows an illustration of an example zone player having a built-in amplifier and speakers.
Figure 2B:
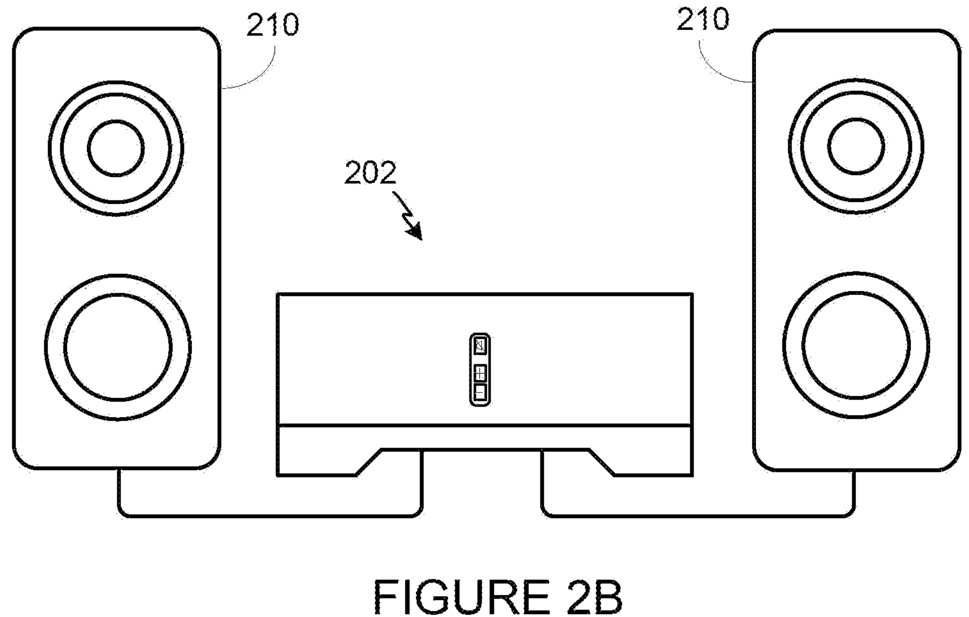
FIG. 2B shows an illustration of an example zone player having a built-in amplifier and connected to external speakers.
Figure 2C:
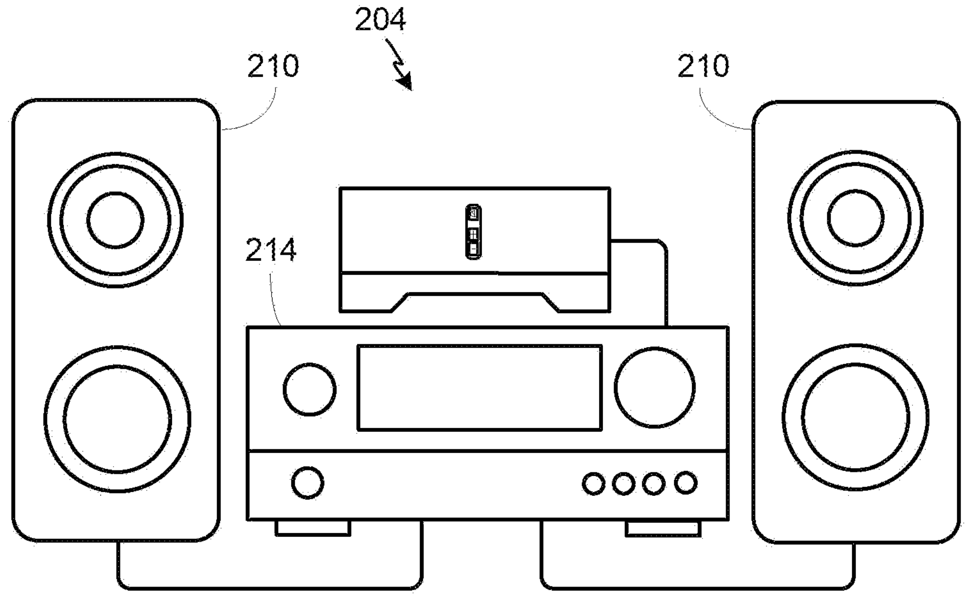
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, California presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
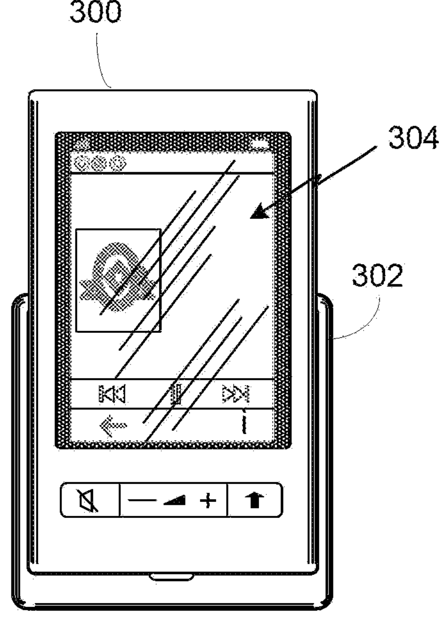
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE®, IPAD®, ANDROID™ powered phone, or any other smart phone or network-enabled device can be used as controller 130. An application running on a laptop or desktop personal computer (PC) or MAC™ can also be used as controller 130. Such controllers may connect to system 100 through an interface with data network 128, a zone player, a wireless router, or using some other configured connection path. Example controllers offered by Sonos, Inc. of Santa Barbara, California include a "Controller 200," "SONOS® CONTROL," "SONOS® Controller for IPHONE®," "SONOS® Controller for IPAD™" "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
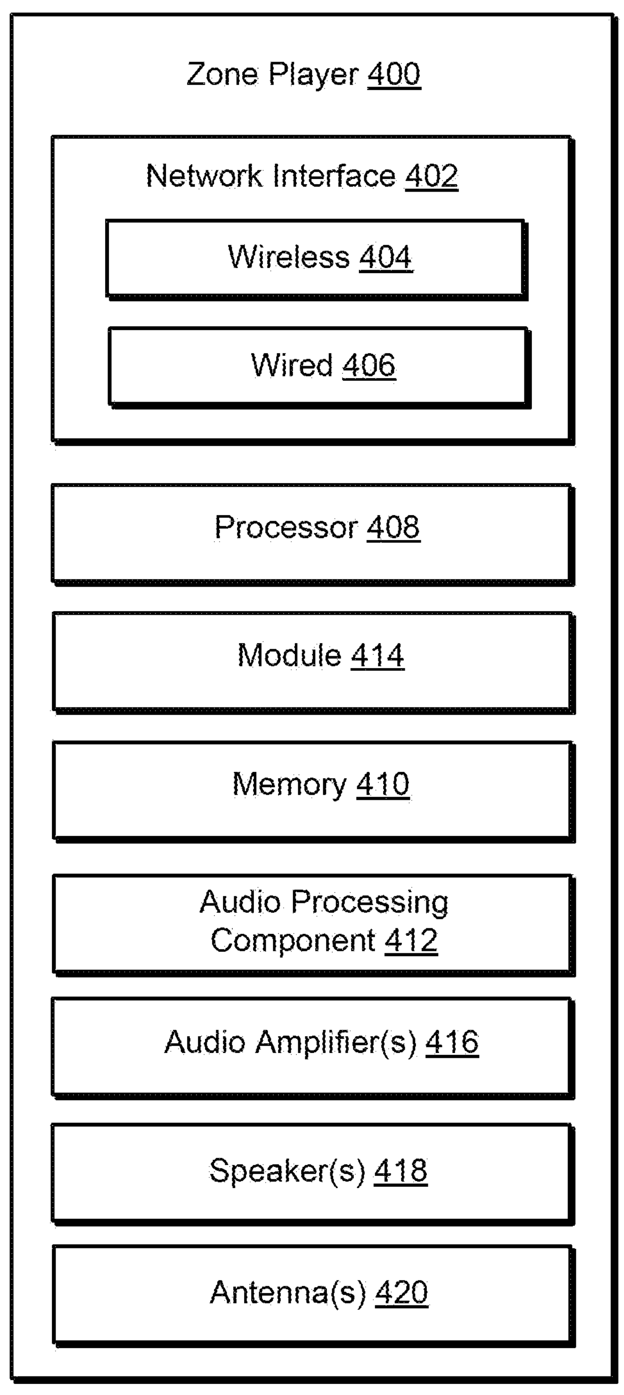
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5.

IV. Example Controller

Figure 5:
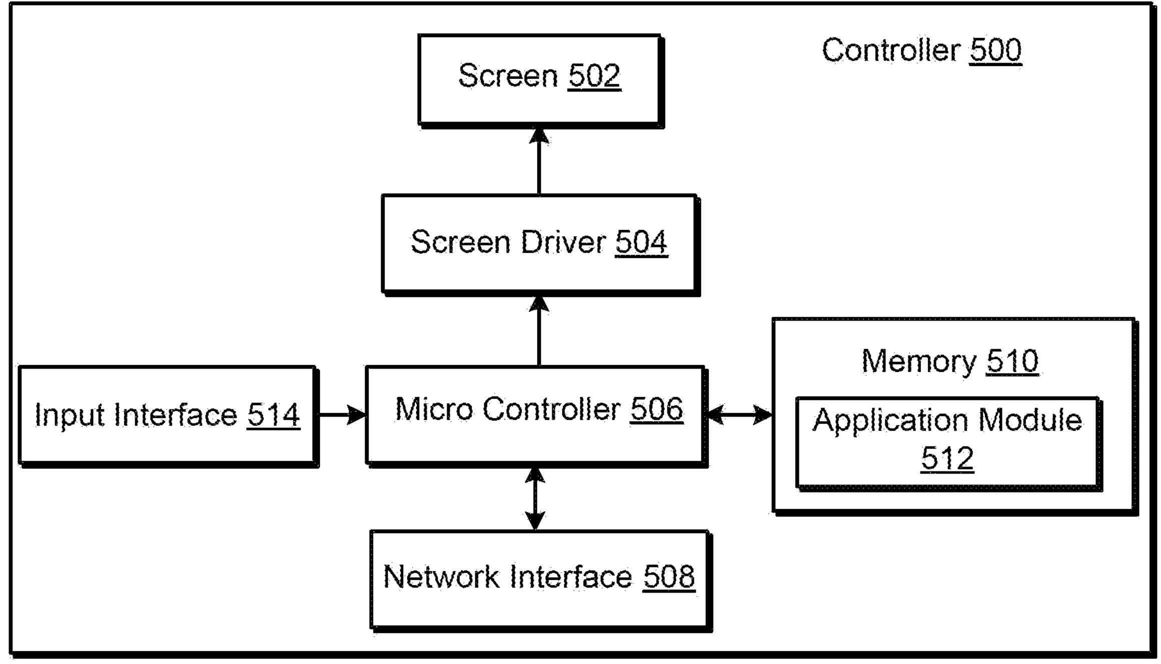
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 502 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®, IPAD® or any other smart phone or network-enabled device (e.g., a networked computer such as a PC or MAC®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
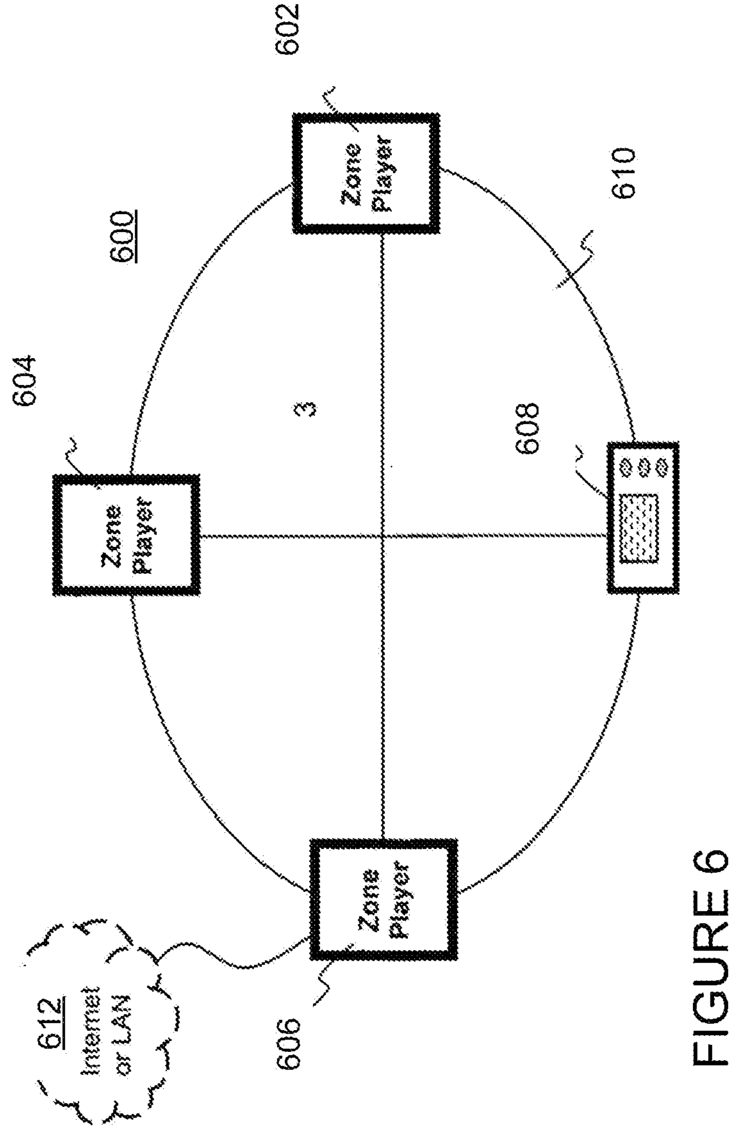
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may come/and go from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 600 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), SSID (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

Communication between devices 602, 604, 606, 608 via the network 610 can occur via a variety of network protocols, such as STP, direct routing, etc. Particularly, to prevent a routing loop, STP or similar network protocols restrict data transmission capabilities of some devices on a network. For example, a first zone player (e.g., represented as a node in an audio network) of an STP network may be blocked, per the protocol, from sending data directly to a second zone player of the STP network. In other words, the first zone player is required to send data destined for the second zone player through an intermediary device, such as a third zone player (e.g., a root node).

Devices of a network that are restricted by a governing protocol, like STP, from transmitting data directly with certain other devices of the network are referred to herein as "blocked." That is, when the network protocol prohibits the first device of the network from directly routing data to the second device, the direct routing (or direct link) between the first and second devices is said to be blocked by the governing network protocol.

Example methods, apparatus, systems, and articles of manufacture disclosed herein provide devices, such as a zone player, with an ability to directly route data, such as audio data, to neighboring devices despite the protocol designation of the link as "blocked." Example methods, apparatus, systems, and articles of manufacture disclosed herein create a direct routing path between a first device and a second device where the first device is otherwise blocked (e.g., according to a designation of the governing protocol) from routing data to the second device.

The direct routing scheme provided by the example methods, apparatus, systems, and articles of manufacture disclosed herein enables the first device to bypass the indirect forwarding route established by the governing protocol, thereby transmitting the forwarded information to a destination device faster and with less network congestion. In an embodiment, the direct route provided by the example methods, apparatus, systems, and articles of manufacture disclosed herein is used in connection with forwarding data (e.g., frames) of a certain type of frame, such as frames having a threshold quality of service (QoS) characteristic(s). In another embodiment, the direct routing scheme is used for data carrying audio content when possible, whereas the governing protocol is followed for other types of data. In yet another embodiment, the direct routing scheme is used by devices on the audio network, such as zone players, to forward multicast traffic using a unicast transmission methodology when possible.

In some examples disclosed herein, one or more characteristics indicative of the connection quality between the first and second devices is monitored. For example, a wireless signal-to-noise level (SNR), also referred to herein as signal strength indicator (SSI), between the first and second devices is monitored to determine a health and/or a measure of reliability of the direct link between the first and second devices. Direct routing may be used, or considered, when the health of the connection meets a certain threshold.

If the monitored characteristic(s) indicate a weakness of the connection, the direct routing between the otherwise blocked devices is disabled. As a result, the first device communicates with the second device in accordance with the governing protocol's "blocked" designation until the monitored characteristic(s) indicate that the connection between the first and second devices has returned to a healthy, reliable state.

VI. Example System Configuration

Figure 7:
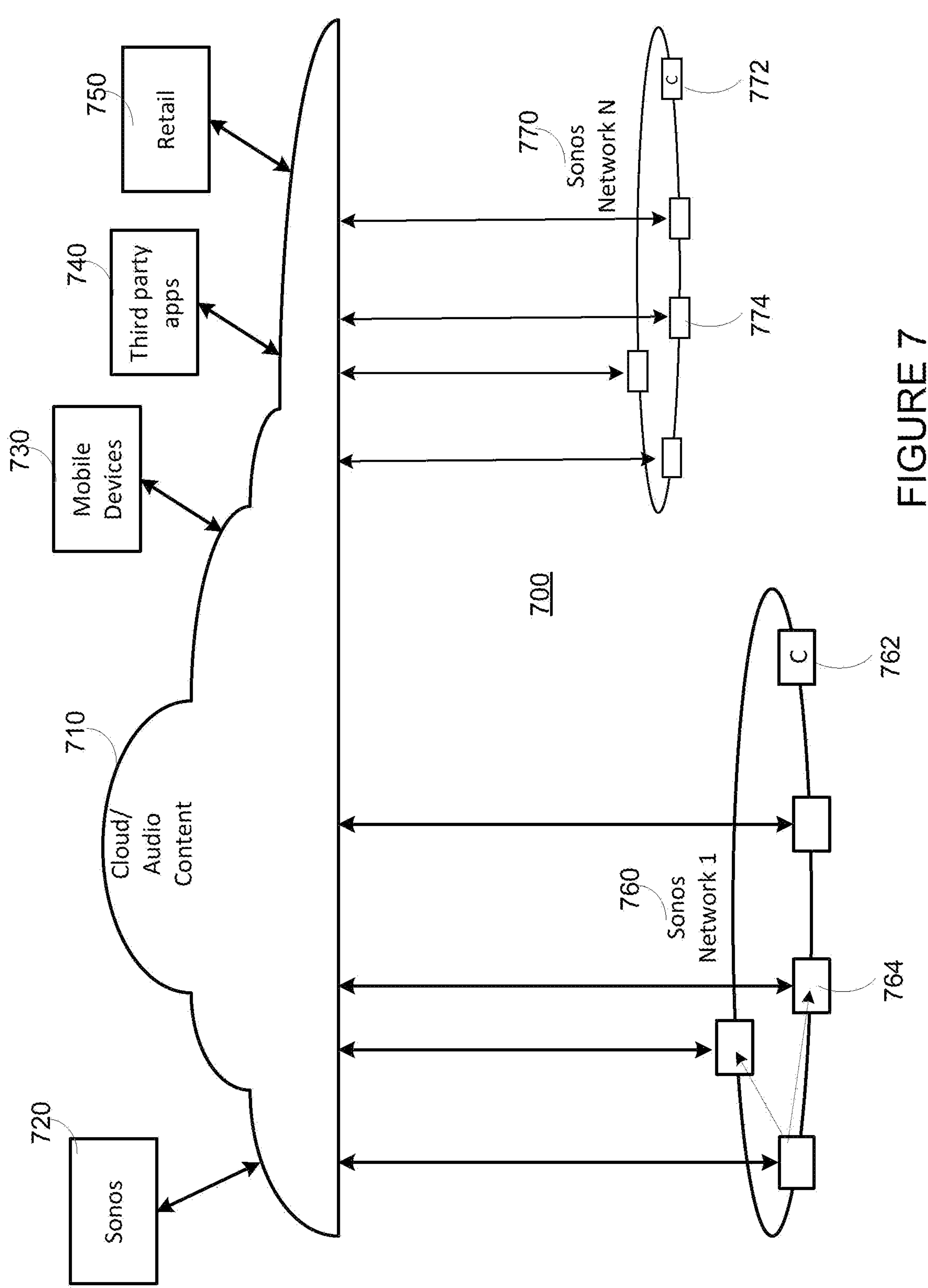
FIG. 7 shows a system including a plurality of networks including a cloud-based network and at least one local playback network.

FIG. 7 shows a system including a plurality of networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia playback system 720 (e.g., SONOS™), a mobile device 730, a third party application 740, a content provider 750 and so on can provide multimedia content (requested or otherwise) to local playback networks 760, 770. Within each local playback network 760, 770, a controller 762, 772 and a playback device 764, 774 can be used to playback audio content.

VII. Example Wired Connection-Determining Zone Player

Certain particular examples will now be provided in connection with FIGS. 8-12 to describe, for purposes of illustration only, certain systems, apparatus and methods that override a governing protocol to provide and facilitate direct communication between nodes of a network audio system.

Figure 8:
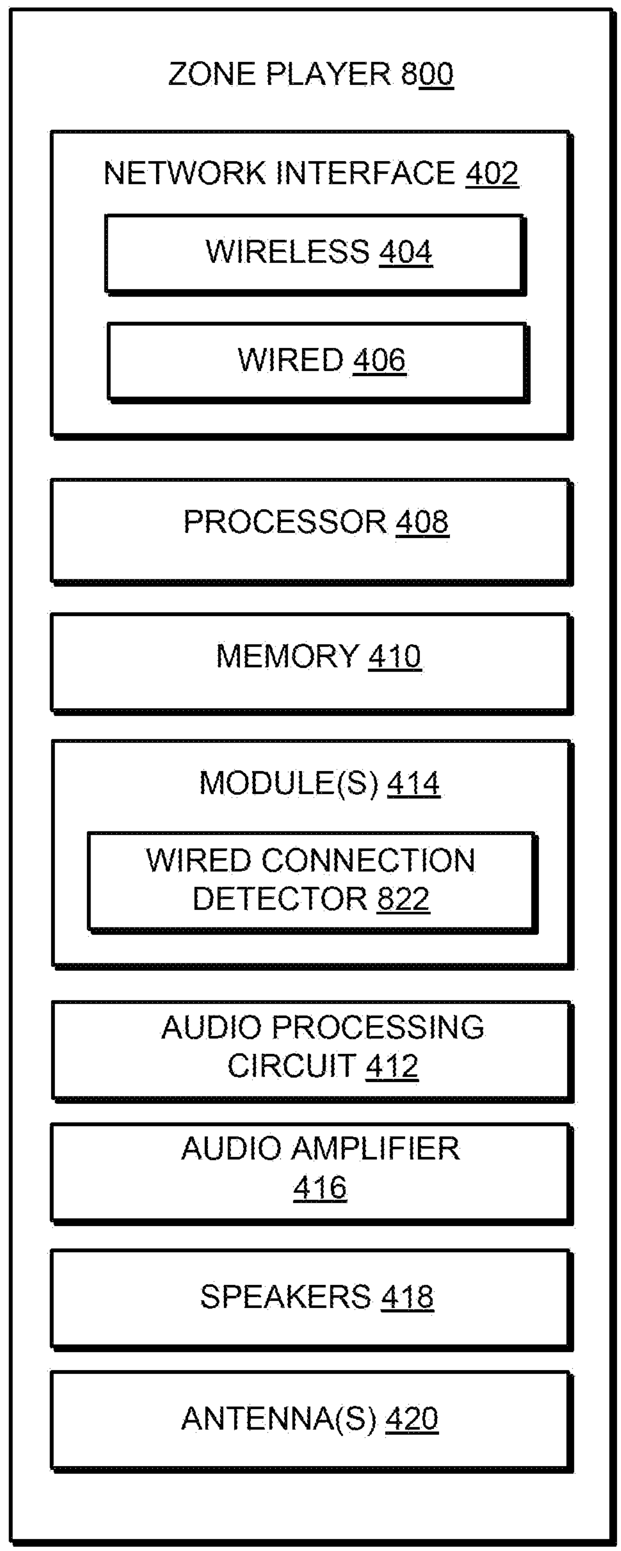
FIG. 8 shows an internal functional block diagram of an example zone player supporting direct routing.

FIG. 8 shows an internal functional block diagram of an example zone player 800 that is capable of communicating wirelessly to either (i) an AP or (ii) a network media system comprising playback devices. The example zone player 800 of FIG. 8 may be used to implement any of the example zone players 102-124 of FIG. 1.

Like the example zone player 400 of FIG. 4, the example zone player 800 of FIG. 8 includes a network interface 402 (including wireless 404 and wired 406 interfaces), a processor 408, a memory 410, an audio processing component 412, a module 414, an audio amplifier 416, speakers 418, and one or more antenna(s) 420. These components are discussed in more detail above. More or less components may be included depending on the desired configuration.

The example zone player 800 of FIG. 8 further includes a wired connection detector 822. The example wired connection detector 822 of FIG. 8 evaluates a plurality of conditions to determine whether the zone player's wired interface 406 has a usable wired connection (e.g., with an access point, router, bridge, etc.).

For example, the wired connection detector 822 transmits a data packet via the wireless interface 404 and then waits to receive the data packet via the wired interface 406. When the data packet has been detected at the wired interface 406, the wired interface 406 can be used instead of the wireless interface 404 for network traffic. The wireless interface 406 can then be used to extend the network for other playback devices. For example, other zone players can use the zone player 800 to join the playback network. In some examples, the wireless connection detector 822 enables a wired connection with one or more other nodes for only some type(s) of data, such as audio data, and not for other type(s) of data, such as Internet data.

VIII. Example Network Configuration

Figure 9A:
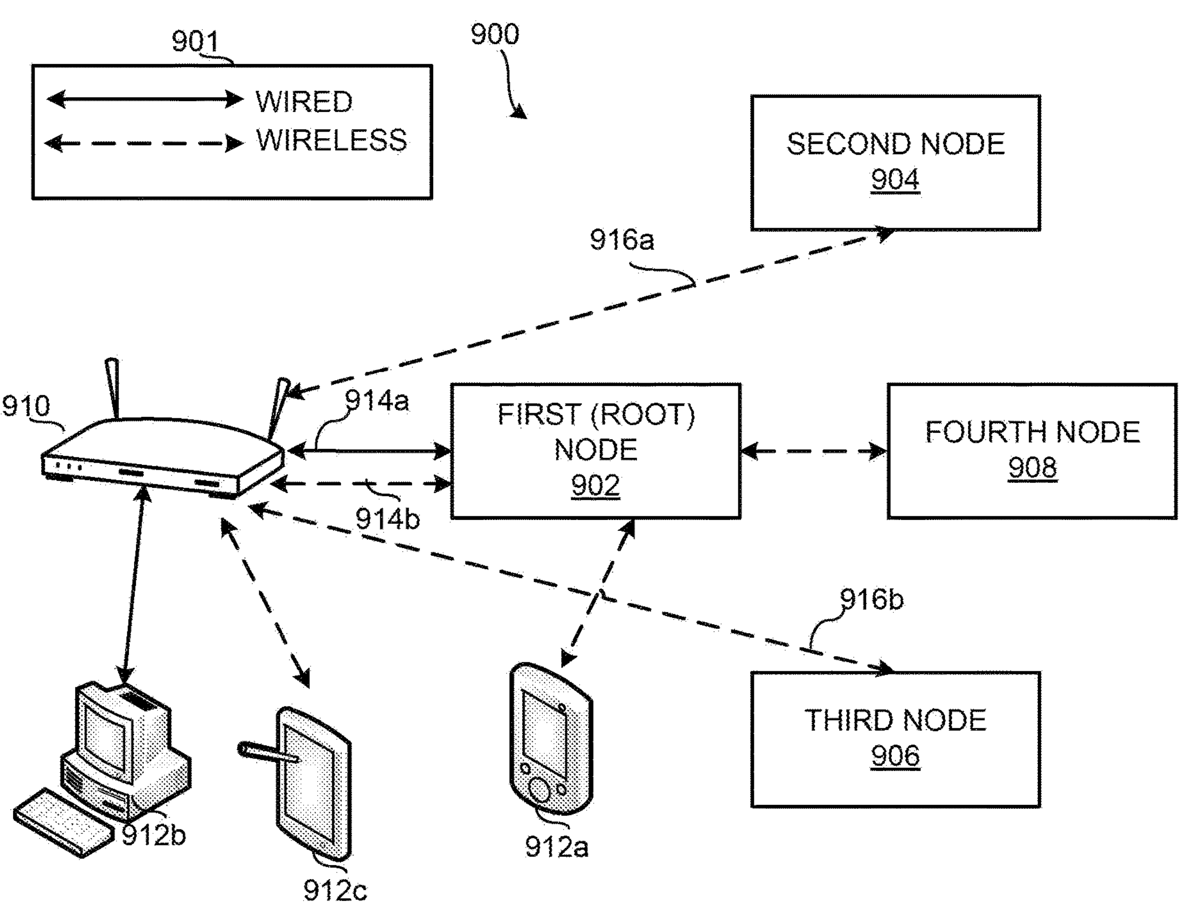
FIGS. 9A-C show example network configurations.

FIG. 9A shows an example network 900 in which example methods and apparatus disclosed herein may be implemented. The example network 900 of FIG. 9A supports a combination of wired and wireless links and/or interfaces, as shown in the legend 901. The example network 900 includes four nodes 902, 904, 906 and 908 and an access point 910. In the illustrated example, the nodes 902-908 correspond to media playback devices, such as the zone players of FIGS. 1, 2A-C, 4, and/or 8. For the purpose of discussion below, zone player (ZP) is used as a general term for all playback devices that can participate on a playback network, although the terms zone player, node, and playback device are used interchangeably throughout. However, example methods and apparatus disclosed herein can be implemented in connection with any suitable type of device represented by the nodes 902-908 of FIG. 9A. The example access point 910 is a router that supports both wired and wireless communication. However, additional or alternative type(s) of access points can be utilized to facilitate communication in the network 900. In the illustrated example, the first node 902 is in communication with the access point 910 via wired connection 914*a* and wireless connection 914*b*. Further, the second node 904, and the third node 906 are in communication with the access point 910 via wireless connections 916*a-b*, respectively. The nodes 902-908 are in communication with each other via one or more forwarding techniques and/or configurations, for example.

The example nodes 902-908 are controlled using any one of a plurality of controllers 912*a-c*. A first one of the controllers 912*a* is implemented by a smart phone (e.g., an ANDROID® smart phone, an IPHONE®, etc.). A second one of the controllers 912*b* is a desktop computer (e.g., a PC or MAC®). A third one of the controllers 912*c* is a tablet device (e.g., an IPAD®). The example controllers 912*a-c* of FIG. 9A correspond to, for example, the example controller 130 of FIG. 1, controller 300 of FIG. 3 and/or example controller 500 of FIG. 5. The example controllers 912*a-c* of FIG. 9A implement an application configured to control the example nodes 902-908. The example controller 912*a* of FIG. 9A communicates with the nodes 902-908 via a direct communication with node 902, for example. The example controllers 912*b-c* of FIG. 9A communicate with the nodes 902-908 via the example access point 910.

Using the example network 900, the nodes 902-908 can share or exchange one or more audio sources and be grouped to play the same or different audio sources. Additionally or alternatively, audio sources can be placed in direct communication with the nodes 902-908. In some examples, the first node 902 and the second node 904 are grouped to playback one piece of music, and at the same time, the third node 906 plays back another piece of music. The fourth node 908 plays yet another piece of music. In other words, the nodes 902-908, as shown in FIG. 9A, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service.

The example network 900 of FIG. 9A may utilize a mesh networking topology to place the nodes 902-908 in communication with each other. In one embodiment, the mesh topology may be used if one of the nodes 902-908 has a wired connection to the AP 910. In this case, the zone player with the wired connection (e.g., zone player 902) can bridge data traffic from the mesh network to the AP 910 over the wired connection. In another embodiment, the mesh topology may be used even if none of the zone players 902-908 have a wired connection to the AP 910 as long as one of the zone players 902-908 has a wireless connection to the AP and is capable of wirelessly bridging traffic from the mesh network to the AP 910. In addition to receiving and processing data (e.g., rendering received audio data), nodes of a meshed network are sometimes required to act as a bridge or relay to forward data to other nodes. Such a network configuration increases the reachability of the individual nodes 902-908. The example mesh network 900 of FIG. 9A may be configured according to a spanning tree protocol (STP), for example, to provide layer-2 routing without routing loops.

In certain examples, the mesh network 900 is based on IEEE 802.1d spanning tree protocol (STP) (with or without some proprietary enhancements). The example mesh network 900 supports meshing over both wired (e.g., wired interface 406) and wireless (e.g., wireless interface 404) interfaces. For a wireless interface (e.g., using 2.4 GHz or 5 GHz, for example), rather than classifying the interface itself as a bridge port (e.g., as it would be according to IEEE 802.1d), each peer zone player that is reachable through the interface is added as a port in the bridge (e.g., in the bridge table). Zone players (ZPs) classify these ports as point-to-point (p2p) and, among other things maintained for a p2p port entry, maintain an interface Media Access Control (MAC) address of a corresponding peer ZP. Traffic flowing through these ports is encapsulated in a p2p header and is forwarded as unicast frames, for example.

For example, in FIG. 9A where the first node 902 has a wired connection 914*a* to the access point 910 and also has a wireless connection 914*b* to the access point 910, the first node 902 includes five port entries in its bridge table: one entry for its wired interface and four entries for its wireless neighbors (e.g., access point 910, second node 904, third node 906, and fourth node 908). Port entries for the second node 904, third node 906, and fourth node 908 identify the nodes as p2p ports and maintain information about an interface MAC address for each node (e.g., used for encapsulation). For example, if the first node 902 is to forward a frame towards the third node 908, the first node 902 first encapsulates the frame in p2p a header with a recipient address of the header set to the wireless interface MAC address of the fourth node 908.

In some embodiments, as mentioned above, one of the nodes 902-908 must have a wired connection to the AP 910 in order use the mesh network between the nodes 902-908. In this case, if none of the nodes 902-908 have a wired connection to the AP 910, a star network topology may be used, wherein the AP communicates directly with each of the nodes 902-908.

In some embodiments, a playback device operates in "station mode" (STA mode) when it has a wireless connection to AP 910, and the playback device operates in "AP/bridge mode" when it has a wireless connection to other playback devices.

In the example of FIG. 9, the first node 902 is in station mode (STA mode) because it has a wireless connection to the AP 910. In addition, node 902 has a wired connection (e.g., Ethernet port) 914*a* to the AP.

In certain examples, the first node 902 determines whether it has a 'useful wired connection' such that the wired connection on the playback device (e.g., a wire plugged into an Ethernet jack on a zone player) provides connectivity to the same subnet that a wireless connection to an access point (AP) has. A simple example of a useful wired connection is an Ethernet cable that connects directly from the zone player 902 to the AP 910.

Figure 9B:
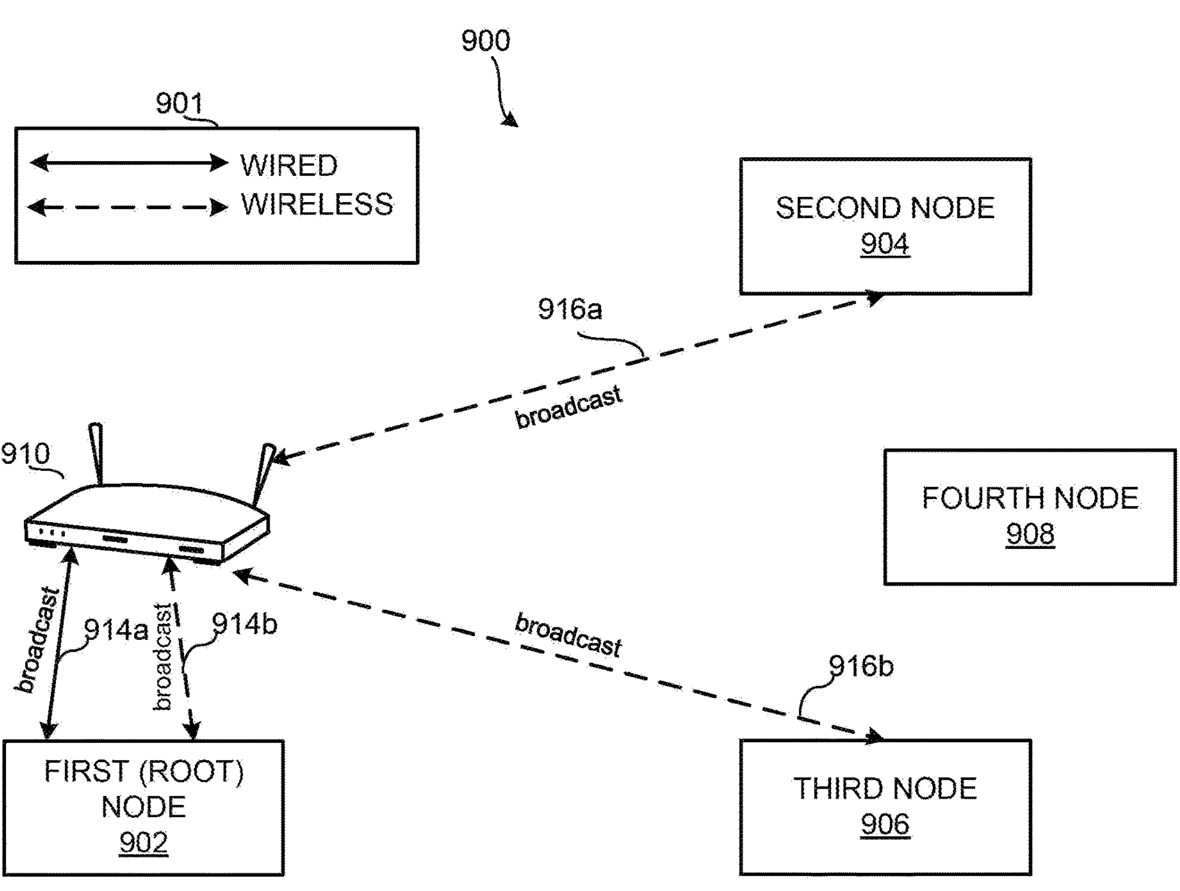

When in STA mode, the first node 902 periodically transmits known broadcast traffic on its wireless interface 914*b*. As shown in the illustration of FIG. 9B, the first node 902 can broadcast a data packet to nodes 904, 906, 908 via its wireless connection 914*b* to the access point 910. If the transmitted packet is detected on the wired interface 914*a*, then the first node 902 has identified that it has a useful wired connection over the wired interface 914*a*.

Figure 9C:
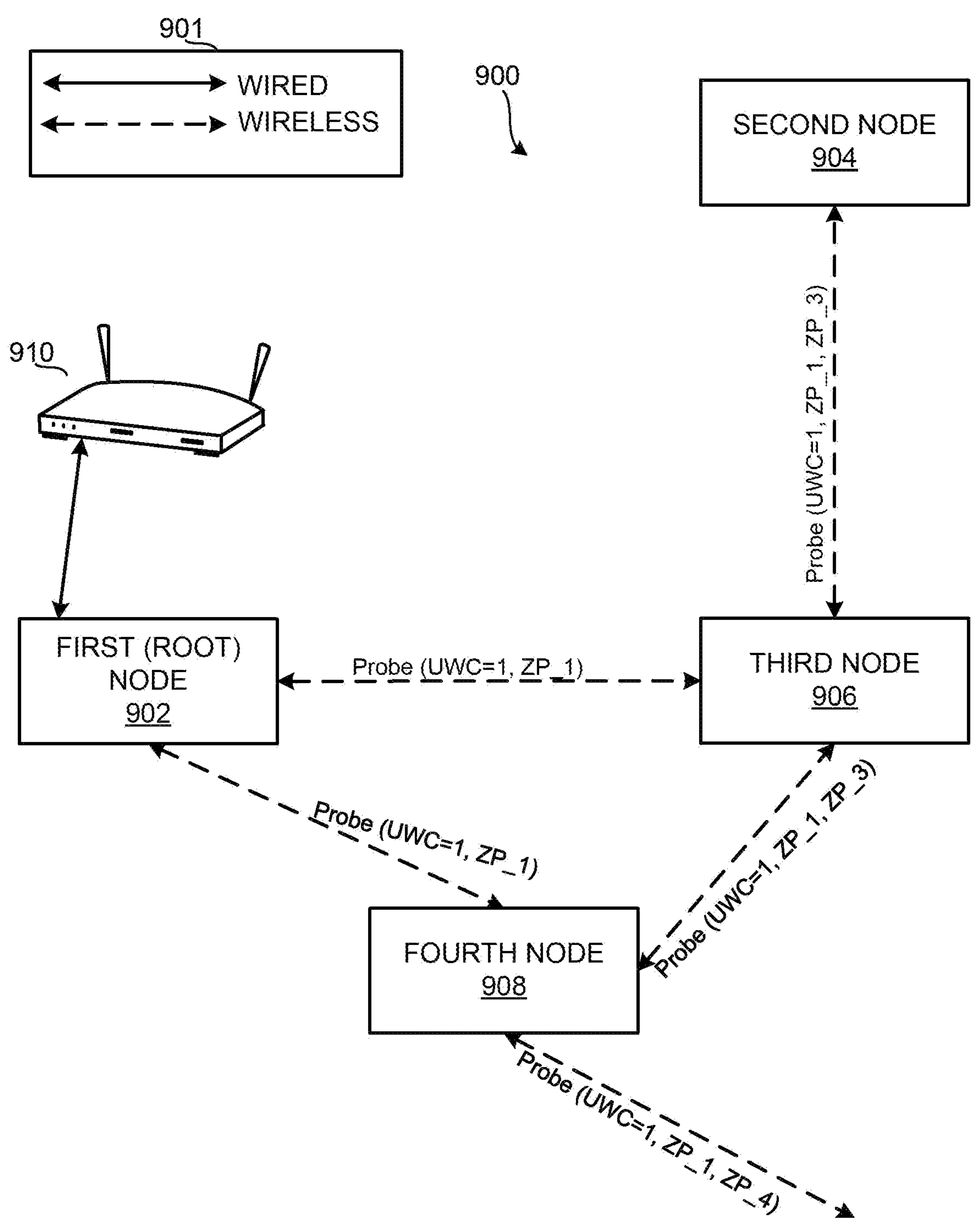

Once the node 902 has determined that it has a useful wired connection, the node 902 advertises that it has a useful wired connection over its wired interface 914*a*. For example, the first node 902 may send probes (and/or via UPnP messages) so that peers on the network 900 (e.g., in the household) may attempt to change their network topology from a first topology (e.g., a star topology) connected to the AP to a different topology (such as a mesh topology) that utilizes the useful wired connection of the first node or zone player 902. For example, FIG. 9C illustrates the first node 902, which has now identified a useful wired connection, transmitting probe messages informing other node 904, 906, 908 of its useful wired connection (UWC). The probe indicating an affirmative ("1") for the UWC and the source of the UWC message (zone player 1 or first node 902) is sent by the first node 902 directly to the third node 906 and fourth node 908. The third node 906 routes the message to the second node 904. As shown in the example of FIG. 9C, the node 902, 904, 906, 908 may form a mesh network using a spanning tree protocol (as discussed above), and may then begin to communicate via the first node 902 and wired connection to the access point 910.

In certain examples, the first node 902 may continue to advertise the useful wired connection until it sees its own MAC address associated to a useful wired connection in a received probe. In another example, the first node 902 may continue to advertise the useful wired connection for a limited duration.

To change the communication protocol of the network 900, the first node 902 reconfigures the wireless driver and the Layer-2 bridge and transitions into a wired, AP-based communication mode (e.g., a SONOSNET™ mode) on the playback network with all ports in the bridge. The transition to the playback network may occur after advertising the node 902 has a useful wired connection for a period of time, for example. The transition to the playback network may occur when audio is not playing (such as in between tracks, if a track is currently playing), for example.

Additionally, using the embodiments described herein, determining a useful wired connection may provide added security to a traditional AP-based wireless network. Specifically, it is possible to have a security breech if a first device on a first wireless network (such as, for example, a wireless bridge) allows a second device that is connected to a wired interface of the first device to connect to a second wireless network that is not the same network as the first wireless network. Using the approach disclosed and described above, such a different connection is not allowed.

In certain examples, an alternate (or additional) approach can be employed by a node to detect a "useful wired connection." The node can detect the presence of an IP address found via a Dynamic Host Configuration Protocol (DHCP) server in combination with lack of a valid AP connection.

Figure 10:
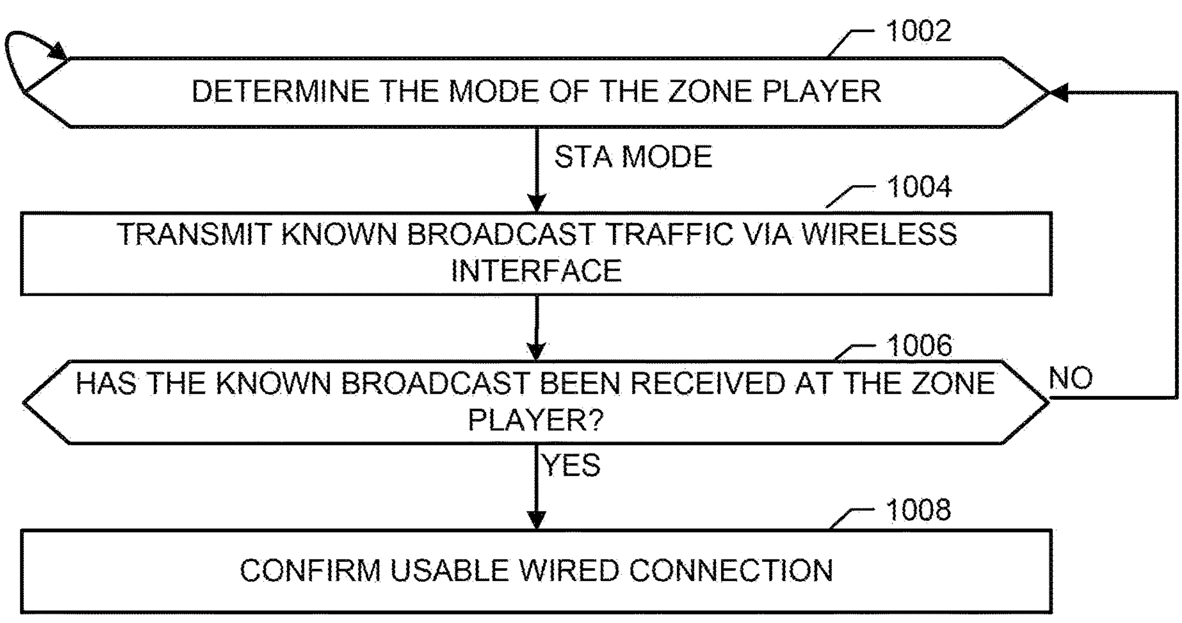
FIGS. 10 and 11 show flowcharts for example methods or processes for the example determination and use of a useful wired connection.

FIG. 10 illustrates a flow diagram of an example method 1000 to determine whether a device has a useful wired connection. At block 1002, the zone player (e.g., a zone player or other playback device) determines its mode. For example, the zone player determines if the wireless interface is in station mode ("STA" mode) or in AP/bridge mode. In another example, the zone player determines if there is a connection over the wired interface. If the zone player is in station mode ("STA" mode), then, at block 1004, the zone player transmits known broadcast traffic via the device's wireless communication interface. The zone player may periodically transmit a message of known content over its wireless network interface, for example.

The zone player then listens to incoming message traffic over a wired network interface associated with device. At block 1006, the zone player determines whether it has received, at its wired interface, the known broadcast traffic sent by the device over its wireless interface. At block 1008, when the zone player has received the known broadcast message over the wired network interface, the device confirms a useful wired connection.

Figure 11:
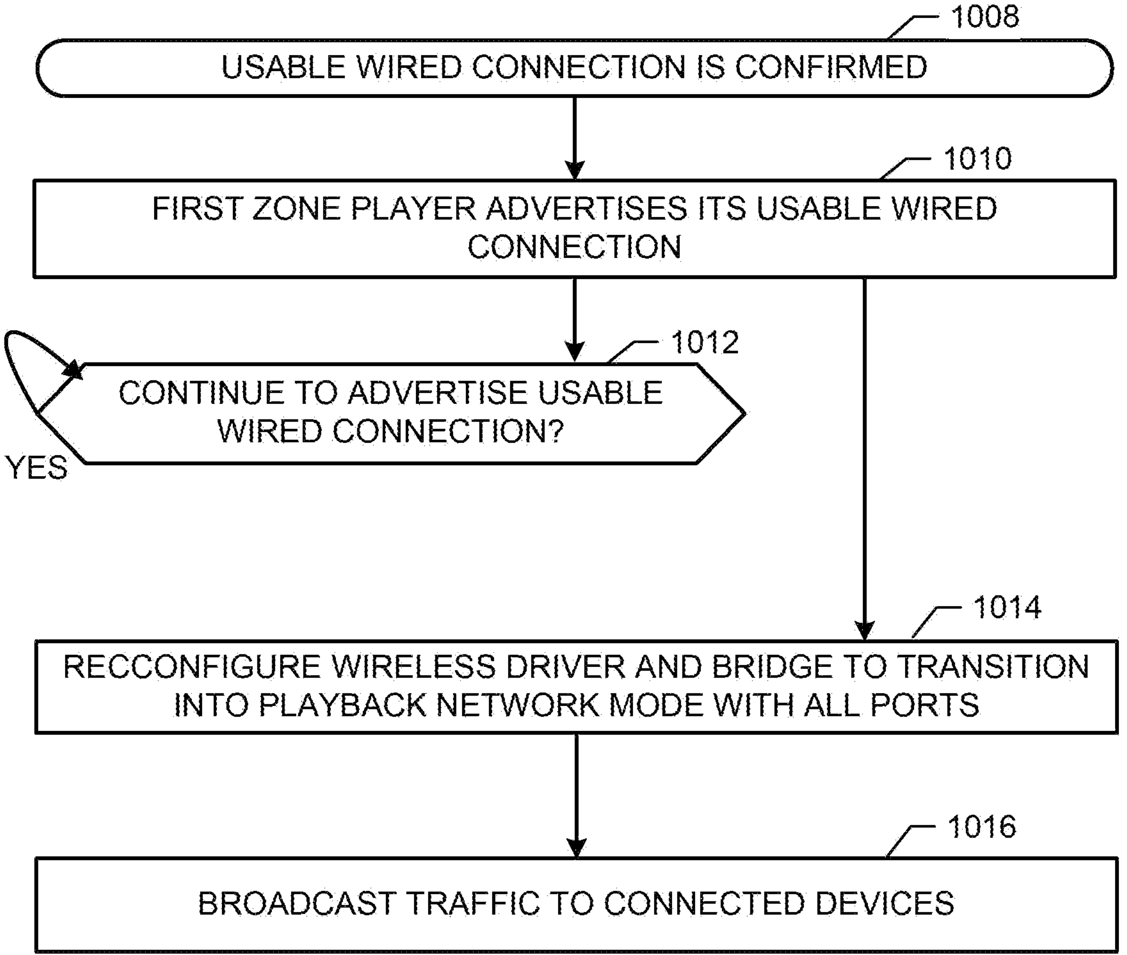

As illustrated in the example flow diagram of FIG. 11, at block 1010, once the useful wired connection is confirmed, the zone player advertises its useful wired connection. For example, the device advertises that it has a useful wired connection via probes (and/or via UPnP messages) so that other devices can join the device in playback network mode.

At block 1012, the zone player continues to advertise the useful wired connection according to one or more parameters/constraints (e.g., until a triggering event occurs, such a time, message receipt, number of attempts, etc.). In certain examples, the zone player may continue to advertise the useful wired connection until it sees its own MAC address in a received probe. In other examples, the zone player may continue to advertise the useful wired connection for a limited duration.

At block 1014, the zone player reconfigures its wireless driver and bridge (e.g., the Layer-2 bridge) to transition into playback network mode (e.g., mesh network communication mode) with the ports in the bridge. In certain examples, the transition may occur after the zone player has advertised it has a useful wired connection for a period of time. In certain examples, the transition may occur when audio is not playing (such as in between tracks, if a track is currently playing). In certain examples, the playback network mode is a mesh network configuration.

At block 1016, the zone player then broadcasts traffic to connected node(s) as received via its useful wired connection. For example, the first zone player can transmit playback content and/or configuration information to other connected device(s).

Thus, for example, a device transmits a message to at least one other device over the first device's wireless network interface indicating that the other device(s) can change network configuration to utilize the wired network interface of the first device (e.g., switching the devices from communicating with the AP to communicating over a mesh network via the first device). In certain examples, the indication of change causes at least one other device to change its network configuration to a mesh network configuration. In certain examples, the message may include a MAC address associated with the first device to identify the first device to the one or more additional devices seeking to connect to the first device.

XI. Conclusion

Thus, certain examples provide systems, methods and apparatus to identify a useful wired connection. Certain examples further provide systems, methods and apparatus to adjust a network configuration to utilize the useful wired connection to implement a playback network (e.g., a wireless mesh network) for device communication. Certain examples improve network and communication security through more robust determination of connection and network configuration status.

Certain examples provide a method to identify a useful wired connection. The example method includes periodically transmitting, by a first device, a first message over a wireless network interface. The example method includes listening, by the first device, for the first message over a wired network interface. The example method includes, when the first device at least receives the first message over the wired network interface, transmitting, by the first device to at least one additional device over the wireless network interface, a second message, wherein the second message includes an indication, the indication indicating that the at least one additional device can change its network configuration to utilize the wired network interface of the first device.

Certain examples provide a non-transitory computer-readable storage medium including a set of instructions for execution by a processor. The example set of instructions, when executed, cause a first device to transmit a first message over a wireless network interface. The example set of instructions, when executed, cause the first device to listen for the first message over a wired network interface. The example set of instructions, when executed, cause the first device to, when the first device at least receives the first message over the wired network interface, transmit to at least one additional device over the wireless network interface, a second message, wherein the second message includes an indication, the indication indicating that the at least one additional device can change its network configuration to utilize the wired network interface of the first device.

Certain examples provide a device including a wired network interface, a wireless network interface, a processor, data storage, and program logic stored in the data storage and executable by the processor. The example program logic is to transmit a first message over the wireless network interface. The example program logic is to listen for the first message over the wired network interface. The example program logic is to, when the device at least receives the first message over the wired network interface, transmit to at least one additional device over the wireless network interface, a second message, wherein the second message includes an indication, the indication indicating that the at least one additional device can change its network configuration to utilize the wired network interface of the device.

The description above discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As mentioned above, example methods or processes may be implemented using coded instructions (e.g., computer readable instructions) stored on a tangible computer readable medium such as a computer readable storage medium (e.g., hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information)). As used herein, the term tangible computer readable storage medium is expressly defined to include any type of computer readable storage medium and to exclude propagating signals. Additionally or alternatively, the example processes or methods may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable medium and to exclude propagating signals.

As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A computing device comprising:
- a first communication interface;
- a second communication interface;
- at least one processor;
- at least one non-transitory computer-readable medium; and
- program instructions stored on the at least one non-transitory computer-readable medium that are executable by the at least one processor such that the computing device is configured to:
  - establish, via the first communication interface over a first network connection, a first communication path with a playback device, wherein the first network connection utilizes a first communication protocol;
  - transmit, to the playback device via the first communication path, one or more commands to control playback of audio content;
  - while connected to the playback device via the first communication interface over the first network connection that utilizes the first communication protocol:
    - detect, via the second communication interface, that a second network connection is available, wherein the second network connection utilizes a second communication protocol that is different from the first communication protocol;
    - based on detecting that the second network connection is available, establish, via the second communication interface, the second network connection utilizing the second communication protocol;
    - after establishing the second network connection, determine that a second communication path with the playback device is available via the second network connection; and
    - based on determining that the second communication path with the playback device is available via the second network connection, establish the second communication path with the playback device via the second network connection; and
  - after establishing the second communication path with the playback device, transmit, to the playback device via the second communication path, one or more commands to control playback of audio content.

2. The computing device of claim 1, wherein the first communication interface is a wireless communication interface, and wherein the second communication interface is a wired communication interface.

3. The computing device of claim 1, wherein the first communication protocol is an IEEE 802.15 communication protocol, and wherein the second communication protocol is an IEEE 802.11 communication protocol.

4. The computing device of claim 1, wherein the program instructions that are executable by the at least one processor such that the computing device is configured to determine that a second communication path with the playback device is available via the second network connection comprise program instructions that are executable by the at least one processor such that the computing device is configured to:
- receive, via the second network connection, a message indicating that the second communication path with the playback device is available, the message comprising identifying information for one or both of (i) the computing device or (ii) the playback device.

5. The computing device of claim 4, wherein the identifying information for one or both of (i) the computing device or (ii) the playback device comprises a MAC address.

6. The computing device of claim 1, further comprising program instructions stored on the at least one non-transitory computer-readable medium that are executable by the at least one processor such that the computing device is configured to:
- after establishing the second communication path with the playback device, discontinue transmitting, to the playback device via the first communication path, one or more commands to control playback of audio content.

7. The computing device of claim 6, wherein the program instructions that are executable by the at least one processor such that the computing device is configured to discontinue transmitting, to the playback device via the first communication path, one or more commands to control playback of audio content comprise program instructions that are executable by the at least one processor such that the computing device is configured to:
- discontinue the first communication path with the playback device.

8. A non-transitory computer-readable medium, wherein the non-transitory computer-readable medium is provisioned with program instructions that, when executed by at least one processor, cause a computing device comprising a first communication interface and a second communication interface to:
- establish, via the first communication interface over a first network connection, a first communication path with a playback device, wherein the first network connection utilizes a first communication protocol;
- transmit, to the playback device via the first communication path, one or more commands to control playback of audio content;
- while connected to the playback device via the first communication interface over the first network connection that utilizes the first communication protocol:
  - detect, via the second communication interface, that a second network connection is available, wherein the second network connection utilizes a second communication protocol that is different from the first communication protocol;
  - based on detecting that the second network connection is available, establish, via the second communication interface, the second network connection utilizing the second communication protocol;
  - after establishing the second network connection, determine that a second communication path with the playback device is available via the second network connection; and
  - based on determining that the second communication path with the playback device is available via the second network connection, establish the second communication path with the playback device via the second network connection; and after establishing the second communication path with the playback device, transmit, to the playback device via the second communication path, one or more commands to control playback of audio content.

9. The non-transitory computer-readable medium of claim 8, wherein the first communication interface is a wireless communication interface, and wherein the second communication interface is a wired communication interface.

10. The non-transitory computer-readable medium of claim 8, wherein the first communication protocol is an IEEE 802.15 communication protocol, and wherein the second communication protocol is an IEEE 802.11 communication protocol.

11. The non-transitory computer-readable medium of claim 8, wherein the program instructions that, when executed by at least one processor, cause the computing device to determine that a second communication path with the playback device is available via the second network connection comprise program instructions that, when executed by at least one processor, cause the computing device to:

receive, via the second network connection, a message indicating that the second communication path with the playback device is available, the message comprising identifying information for one or both of (i) the computing device or (ii) the playback device.

12. The non-transitory computer-readable medium of claim 11, wherein the identifying information for one or both of (i) the computing device or (ii) the playback device comprises a MAC address.

13. The non-transitory computer-readable medium of claim 8, wherein the non-transitory computer-readable medium is also provisioned with program instructions that, when executed by at least one processor, cause the computing device to:

after establishing the second communication path with the playback device, discontinue transmitting, to the playback device via the first communication path, one or more commands to control playback of audio content.

14. The non-transitory computer-readable medium of claim 13, wherein the program instructions that, when executed by at least one processor, cause the computing device to discontinue transmitting, to the playback device via the first communication path, one or more commands to control playback of audio content comprise program instructions that, when executed by at least one processor, cause the computing device to:

discontinue the first communication path with the playback device.

15. A method carried out by a computing device comprising a first communication interface and a second communication interface, the method comprising:

establishing, via the first communication interface over a first network connection, a first communication path with a playback device, wherein the first network connection utilizes a first communication protocol;

transmitting, to the playback device via the first communication path, one or more commands to control playback of audio content;

while connected to the playback device via the first communication interface over the first network connection that utilizes the first communication protocol:

detecting, via the second communication interface, that a second network connection is available, wherein the second network connection utilizes a second communication protocol that is different from the first communication protocol;

based on detecting that the second network connection is available, establishing, via the second communication interface, the second network connection utilizing the second communication protocol;

after establishing the second network connection, determining that a second communication path with the playback device is available via the second network connection; and based on determining that the second communication path with the playback device is available via the second network connection, establishing the second communication path with the playback device via the second network connection; and after establishing the second communication path with the playback device, transmitting, to the playback device via the second communication path, one or more commands to control playback of audio content.

16. The method of claim 15, wherein the first communication interface is a wireless communication interface, and wherein the second communication interface is a wired communication interface.

17. The method of claim 15, wherein the first communication protocol is an IEEE 802.15 communication protocol, and wherein the second communication protocol is an IEEE 802.11 communication protocol.

18. The method of claim 15, wherein determining that a second communication path with the playback device is available via the second network connection comprises:

receiving, via the second network connection, a message indicating that the second communication path with the playback device is available, the message comprising identifying information for one or both of (i) the computing device or (ii) the playback device.

19. The method of claim 15, further comprising:

after establishing the second communication path with the playback device, discontinuing transmitting, to the playback device via the first communication path, one or more commands to control playback of audio content.

20. The method of claim 19, wherein discontinuing transmitting, to the playback device via the first communication path, one or more commands to control playback of audio content comprises:

discontinuing the first communication path with the playback device.

* * * * *